United States Patent [19]

Spaan et al.

[11] 3,977,976

[45] Aug. 31, 1976

[54] APPARATUS FOR EXCHANGE OF SUBSTANCES BETWEEN TWO MEDIA ON OPPOSITE SIDES OF A MEMBRANE

[76] Inventors: Josef A. E. Spaan, Buyaard 5; Pieter C. Veenstra, Pelikaanlaan 1; Johannes M. M. Oomens, Jan van Helustraat 14, all of Eindhoven, Netherlands

[22] Filed: Aug. 5, 1974

[21] Appl. No.: 494,884

[30] Foreign Application Priority Data

Aug. 5, 1973 Netherlands ...................... 7310808

[52] U.S. Cl. .................... 210/321 B; 23/258.5 M
[51] Int. Cl.² .................................. B01D 31/00
[58] Field of Search .................. 210/22, 321, 456; 23/258.5

[56] References Cited
UNITED STATES PATENTS 3,674,440  7/1972  Kitrilakis ...................... 210/321 X
3,771,658  11/1973  Brumfield ...................... 210/321 X Primary Examiner—Frank A. Spear, Jr.
Attorney, Agent, or Firm—Stevens, Davis, Miller & Mosher

[57] ABSTRACT

An apparatus for exchanging substances through a membrane which is permeable thereto has a drum or the like rotatably disposed in a housing, a membrane in spaced relation with the housing and drum about the drum, inlet means for introducing a liquid containing a substance which is to be replaced with another substance and a discharge means spaced from the inlet means to cause tangential flow of the liquid between the drum and membrane, and means for introducing fresh fluid into the housing.

12 Claims, 8 Drawing Figures

APPARATUS FOR EXCHANGE OF SUBSTANCES BETWEEN TWO MEDIA ON OPPOSITE SIDES OF A MEMBRANE

This invention relates to an apparatus for the exchange of substances between two media on either side of at least one membrane, especially a blood oxygenator, which apparatus is provided with a housing containing a rotatable body of revolution between which and one side of the membrane there is provided a first space in the form of a thin, annular gap, and a second space which is bounded by the other side of the membrane and by the housing, inlet and outlet openings through which the first medium is fed into and discharged from the first space, and inlet and outlet openings through which the second medium is fed into and discharged from the second space.

An apparatus of the general type indicted above is known from a paper of K. H. Keller, entitled: "Development of a Couette Oxygenator," Proc. Artif. Heart Prog. Conf., 1969, p. 393 – 403, and from a paper of Gaylor et al., entitled: "Gas Transfer and Thrombogenesis in an Annular Membrane Oxygenator with Active Blood Mixing," Trans. Amer. Soc, Artif. Int. Organs 1973, p. 516 – 524.

Both papers deal with a blood oxygenator of the membrane type. The media present on either side of the membrane are blood and oxygen. The substances to be exchanged are carbon dioxide and oxygen. These known oxygenators comprise an inner cylinder and an outer concentric cylinder between which cylinders there is provided an annular gap which is hereinafter referred to as a blood compartment. Blood, which is to absorb oxygen, is transported through the blood compartment in an axial direction.

In the oxygenator according to Keller the membrane is positioned on the inner cylinder. The latter is porous, so that from the inside of the inner cylinder oxygen can be fed to the blood compartment.

The inner cylinder is stationary and the outer cylinder is driven. The gap widths are 0.6 and 1 mm. Rotation of the outer cylinder is found to promote the oxygen transport to the blood. It is assumed that this is to be attributed to the shearing forces acting in the blood, which forces cause the red blood corpuscles to rotate and, hence, the plasma to mix and, consequently, the resistance to oxygen transport in the plasma to decrease.

In the oxygenator of Gaylor et al. the inner cylinder rotates and the membrane is supported by a porous foam layer provided on the inside of the outer cylinder. The gap widths applied here are 1.7 and 3 mm. Oxygen is fed in at the upper end of the foam layer and leaves the oxygenator through openings at the lower end of the outer cylinder.

These known oxygenators have the disadvantage that the membrane support covers part of the surface, which part therefore does not contribute to the transport of matter.

Moreover, with these oxygenators the thickness of the blood film is restricted to a lower limit, reduction of the annular gap between the cylinders causing the resistance to axial flow of the blood and, hence, the required difference in pressure between the blood inlet and the blood outlet to increase. On the other hand, widening of the gap would lead to an increase in blood volume of the oxygenator. Furthermore, it will be clear that with these known oxygenators the gap width is determined by the construction and can be modified only by changing the diameters of the cylinders.

With the apparatus according to the invention these drawbacks are obviated. It is characterized in that the membrane is mounted while in a state of pre-tension and in that the inlet and the outlet are provided in the first space in such a way that the first medium flows through the gap in a tangential direction.

In the apparatus according to the invention the membrane will move away from the body of revolution upon rotation thereof. The gap between the membrane and the body of revolution will be automatically set now to a certain width which is dependent, for instance, on the rotational speed of the body of revolution and on the throughput of the first medium through the gap.

The rotation will give rise to the setting up in the body of revolution of shearing forces which impose a tensile load on the membrane. The resulting tensile stress is largest at the blood inlet side and decreases downstream of the inlet. So the membrane is stretched most at the inlet side. Now in order to prevent that further along on the downstream side the membrane will go slack, the pre-tension in the membrane should be sufficiently great for it still to exhibit some tension at all points. In this way it can be ensured that with the changing of the thickness of the blood film the membrane will as closely as possible remain near the surface of the blood film.

Unlike the membrane for the known apparatus, the present membrane requires no mechanical support; the gap width is controlled hydrodynamically. Loss of effective membrane surface area is therefore avoided.

Moreover, the apparatus according to the invention makes it possible to closely control the width of the gap. For instance, at a given throughput of the medium passing through the gap an increase in rotational speed will cause the gap width to decrease. In contrast to the situation with the known apparatuses this decrease in gap width does not lead to an undesirable increase in resistance to the flow of the first medium in the gap. Consequently, it is possible to use small gap widths, as a result of which the resistance to diffusion is reduced.

Another advantage of the apparatus according to the invention resides in the fact that part of the first medium recirculates in that it is returned by the body of revolution. In the case of a blood oxygenator therefore a more intensive oxygen absorption or carbon dioxide desorption may be obtained. If there is no net throughput, the amount of blood necessary to fill the space within the oxygenator can yet be kept in motion. When the apparatus according to the invention is used as an artificial lung, blood is taken from a vein of a patient and passed to the artificial lung in which it will absorb $O_2$ and desorb $CO_2$. The blood enriched with $O_2$ is fed back to the patient, which may be done, if required, with the aid of a pump.

The blood may be fed to the artificial lung by means of a blood pump. This pump may force the blood to the artificial lung or suck the blood through it. In the latter case the pressure in the gas compartment must remain somewhat lower than the pressure in the blood compartment in order to allow for the formation of a blood film.

Alternately, instead of using a blood pump, the extracorporal blood transport may be effected by applying gravitational flow. In any case it is desirable that the resistance to outflow of the blood at the outlet should be compensated for by having the blood withdrawn by suction at the outlet.

A suitable construction of the apparatus according to the invention is characterized in that the membrane consists of two parts in the form of sheets and in that clamping means are provided for keeping the two membrane parts taut on the body of revolution.

A preferred construction is characterized in that the clamping means comprise four axially extending knife-edged members, two stationary flanges for rotatably supporting the body of revolution and two bridge pieces positioned near the circumference of the body of revolution and extending between the flanges, which flanges and bridge pieces are provided with recesses for receiving the thin sides of the knife-edged members, and in that of the membrane parts the axially extending sides are pushed into the recesses by the knife-edged members.

The apparatus according to the invention is preferably characterized in that between the knife-edged members and the membrane parts there are provided two elastic pre-tensioned sealing rings which each bear against the edges of a membrane part with the tangential parts of the sealing rings bearing against the stationary flanges.

In a very suitable construction the bridge pieces are provided with openings for the inlet and the outlet of the first medium respectively to and from the first space.

A particularly suitable embodiment is characterized in that on the circumference of the body of revolution there is provided a second membrane, inside which there is a third space with an inlet and an outlet through which the second medium is respectively fed into and discharged from the third space.

With this construction the effective membrane surface area is enlarged even further and the average diffusion path is moreover more than halved. A further variation in the construction of the apparatus according to the invention is characterized in that the third space is formed by longitudinal grooves on the circumference of the body of revolution.

A suitable embodiment of the last-mentioned apparatus is characterized in that the second membrane has its ends turned over the edges of the end faces, and in that there are provided two sealing disks which each clamp a turned end of the membrane against an end face of the body of revolution, of which sealing disks one is provided with a continuous central bore and the other with a blind central bore, which sealing disks are also provided with channels running between their bores and the circumference, and in that at its ends the body of revolution is provided with channels which connect the channels in the sealing disks to the longitudinal grooves in the body of revolution, and with a central bore, and in that in the central bores of the sealing disks and of the body of revolution there is provided a feed conduit for the second medium, one end of said conduit serving as inlet for this medium and the other end leading into the blind central bore of the second sealing disk, and in that the space between the outer wall of the feed conduit and the continuous central bore of the body of revolution forms a discharge channel for the second medium.

Furthermore, it is preferred that the end faces of the body of revolution are provided with annular grooves and that O-rings are provided by means of which the turned ends of the second membrane are pushed into the grooves by the sealing disks.

For a proper sealing of the feed conduit in the central bore of the body of revolution it is recommended that of the body of revolution the end face opposite the first sealing disk is provided with an annular recess accommodating an O-ring which tightly fits on the feed conduit and is pushed into the annular recess by the first sealing disk.

The invention will be explained further with reference to the embodiments illustrated in the accompanying drawings.

FIG. 8 is a section taken along the line 8—8 of FIG. 7.

The apparatus according to the invention is particularly suitable to be used as a blood oxygenator and the following description is concerned with this application for the purpose of illustration.

However, the apparatus according to the invention may serve for the exchange of substances in general between gases, between liquids (for instance for blood dialysis), or between gases and liquids (for instance for blood oxygenation).

Figure 1:
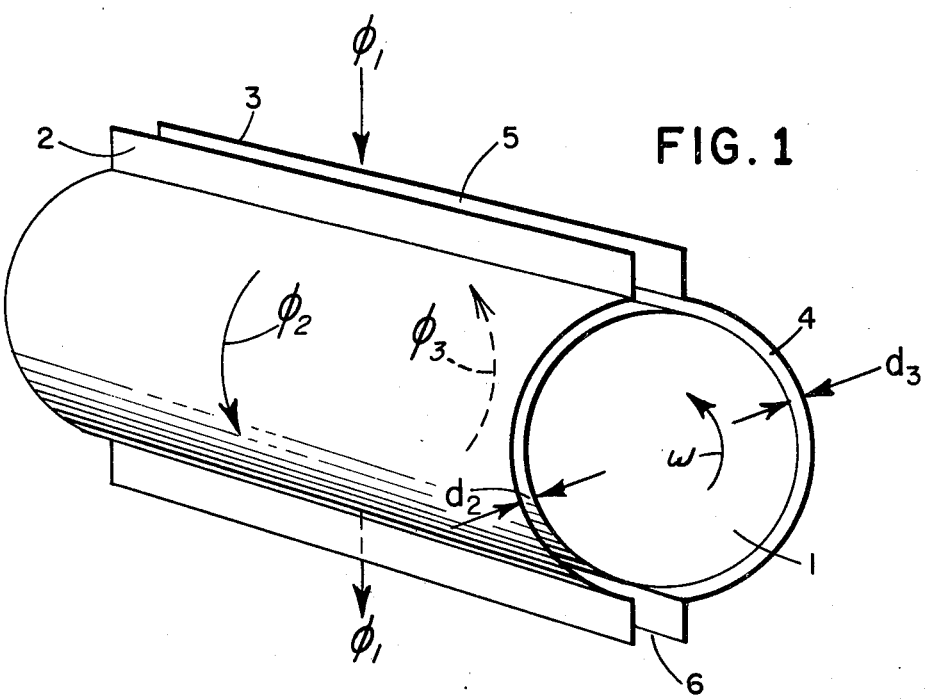
FIG. 1 is a diagrammatic perspective view of one embodiment of an apparatus provided by the invention.

In FIG. 1 with the schematically represented blood oxygenator the numeral 1 refers to a body of revolution in the form of a rotatable drum. The drum may be rotated by a conventional drive (not shown) at some angular velocity $\omega$. Placed on the drum is a thin membrane of silicone rubber consisting of two parts 2 and 3. Parts 2 and 3 are kept taut on the drum 1. Upon rotation of the drum, an annular gap 4 constituting the blood compartment will form between the membrane parts 2 and 3 and the circumferential surface of the drum. At the upper and at the lower side of the drum there are an inlet 5 and an outlet 6 respectively, through which blood is fed into and discharged from the blood compartment 4.

Although in the drawing (FIG. 6) the inlet 5 and the outlet 6 are diametrically opposed, this arrangement is not necessary for a proper working of the apparatus. For instance, the inlet and the outlet may be placed side by side and be separated by a fixed partition. In that case there is only need to use one continuous flat membrane sheet, which is laid on the drum in such a way that its two ends come to lie on either side of the partition. At the end faces of the drum 1 the blood compartment is sealed by any convenient means. The entire construction is enclosed in a housing 60 (FIG. 6) to which oxygen may be fed so that the membrane 2, 3 forms a partition between blood and oxygen.

During rotation of the drum 1 blood will be supplied through the inlet 5 and the pre-tensioned membrane members will move away from the drum to form an annular gap 4. Blood will subsequently flow in tangential direction through the annular blood compartment 4. Through the membrane parts 2, 3 it will take up $O_2$ from the oxygenator housing, to which it will give off $CO_2$. In the oxygenator housing there will consequently be a mixture of $O_2$ and $CO_2$. This mixture is renewed by the continuous supply of $O_2$ to the housing.

Rotation of the drum 1 gives rise to the occurrence in the blood stream of a radial velocity gradient, as a result of which the blood cells will rotate. It is probably partly due to this phenomenon that the oxygen transfer is enhanced by rotation of the drum. The oxygen transport is also increased by the fact that a very thin blood film can be maintained. Thus it is possible without any difficulty to maintain a blood film thickness of $20 \mu m$ at a rotational drum speed of 300 revolutions per minute and a blood throughput of 0.15 l/minute. Use may be made of a drum 10 cm in diameter and 16 cm long; the silicone rubber membrane 2, 3 used may have a surface area of 300 cm$^2$ and a thickness of $100 \mu m$. Under the same conditions use is also made of a membrane having a thickness of $20 \mu m$.

Figure 2:
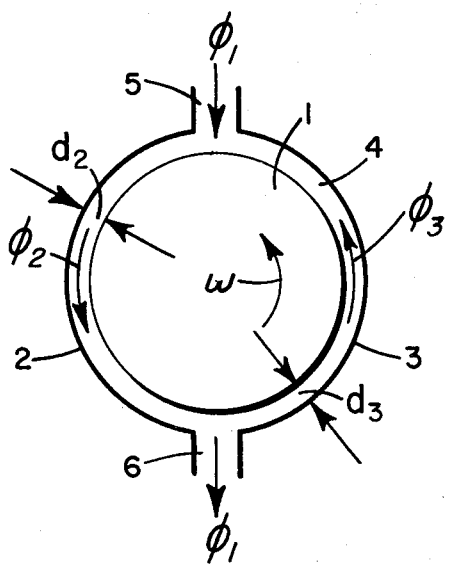
FIG. 2 is a cross-section of the apparatus of FIG. 1.

Moreover, oxygen absorption by the blood is enhanced by recirculation. For when blood is fed to the oxygenator at a throughput rate of $\phi_1$ l/minute (liter per minute), a blood stream $\phi_2$ will form in the left half of the gap 4 drawn in FIG. 2, which blood stream flows in the direction of the outlet 6. Part of this stream, referred to in the FIGS. 1 and 2 by $\phi_3$, will be fed back to the inlet 5.

The relation between these streams is given by:

$$\phi_1 = \phi_2 - \phi_3.$$

As the throughput $\phi_2$ is greater than $\phi_3$, the thickness $d_2$ of the left half of the gap will be somewhat greater than the thickness $d_3$ of the right half of the gap. If the throughput $\phi_1$ is given, the thickness $d$ of the blood film will still only be dependent on the rotational speed of the drum. With increasing rotational speed the mean gap width $(d_2 + d_3)/2$ will generally decrease.

Figure 3:
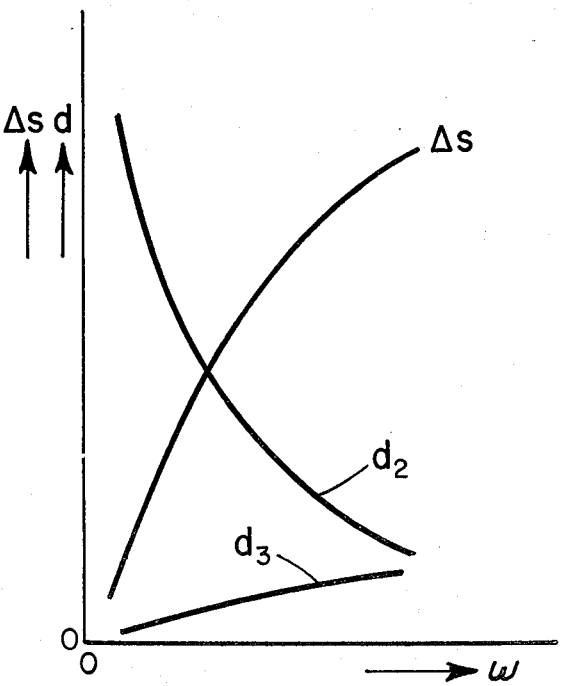
FIG. 3 illustrates a graph relating to the apparatus of FIGS. 1 and 2.

The influence of the rotational speed of the drum on the thicknesses $d_2$ and $d_3$ of the left half of the gap and the right half of the gap is illustrated in the graph of FIG. 3. In it the rotational speed $\omega$ is plotted on the abscissa and the gap width $d$ on the ordinate. With the above-mentioned dimensions of the blood oxygenator the thicknesses $d_2$ and $d_3$ at a blood throughput $\phi_1$ of 0.6 l/minute are 230 and $30 \mu m$, respectively, for a rotational speed of 120 revolutions per minute and 140 and $60 \mu m$, respectively, at a speed of 300 revolutions per minute. The graph of FIG. 3 also shows the saturation increase $\Delta s$ as a function of the rotational speed of the drum. The saturation increase is defined as:

$$\Delta s = s_u - s_i$$

where
$s_u$ = blood saturation at the outlet 6 and
$s_i$ = blood saturation at the inlet 5.

The saturation indicates the percentage of saturation of the hemoglobin with oxygen. For instance, a saturation of 95 percent means that 95 percent of the hemoglobin is enriched with oxygen, which implies that it contains 95 percent of the maximum amount of oxygen capable of being bound in the given situation.

Under the afore-mentioned conditions the saturation increase is 14 percent at a speed of 300 revolutions per minute and 7 percent at a speed of 120 revolutions per minute. At a speed of 240 revolutions per minute and a throughput of 0.11 l/minute the $O_2$ transport was 162 cc STP/m$^2$/min. The membrane used had a thickness of $100 \mu m$.

All measurements were run on an experimental set up in which cattle blood circulated through the oxygenator in a closed circuit. By means of a tubing pump with adjustable output it was transported to the oxygenator, in which it was enriched with oxygen and subsequently passed to a de-oxygenator and freed from part of its $O_2$ content, after which the oxygen-poor blood was fed back to the oxygenator by the tubing pump. At the inlet and at the outlet of the oxygenator the inlet and the outlet saturation $s_i$ and $s_u$, respectively, were measured with a saturation meter. The gas atmosphere in the housing of the oxygenator contained 95 percent $O_2$ and 5 percent $CO_2$. De-oxygenation of the blood took place in a disk-type oxygenator to which a gas mixture containing 95 percent $N_2$ and 5 percent $CO_2$ has been fed.

Figure 4:
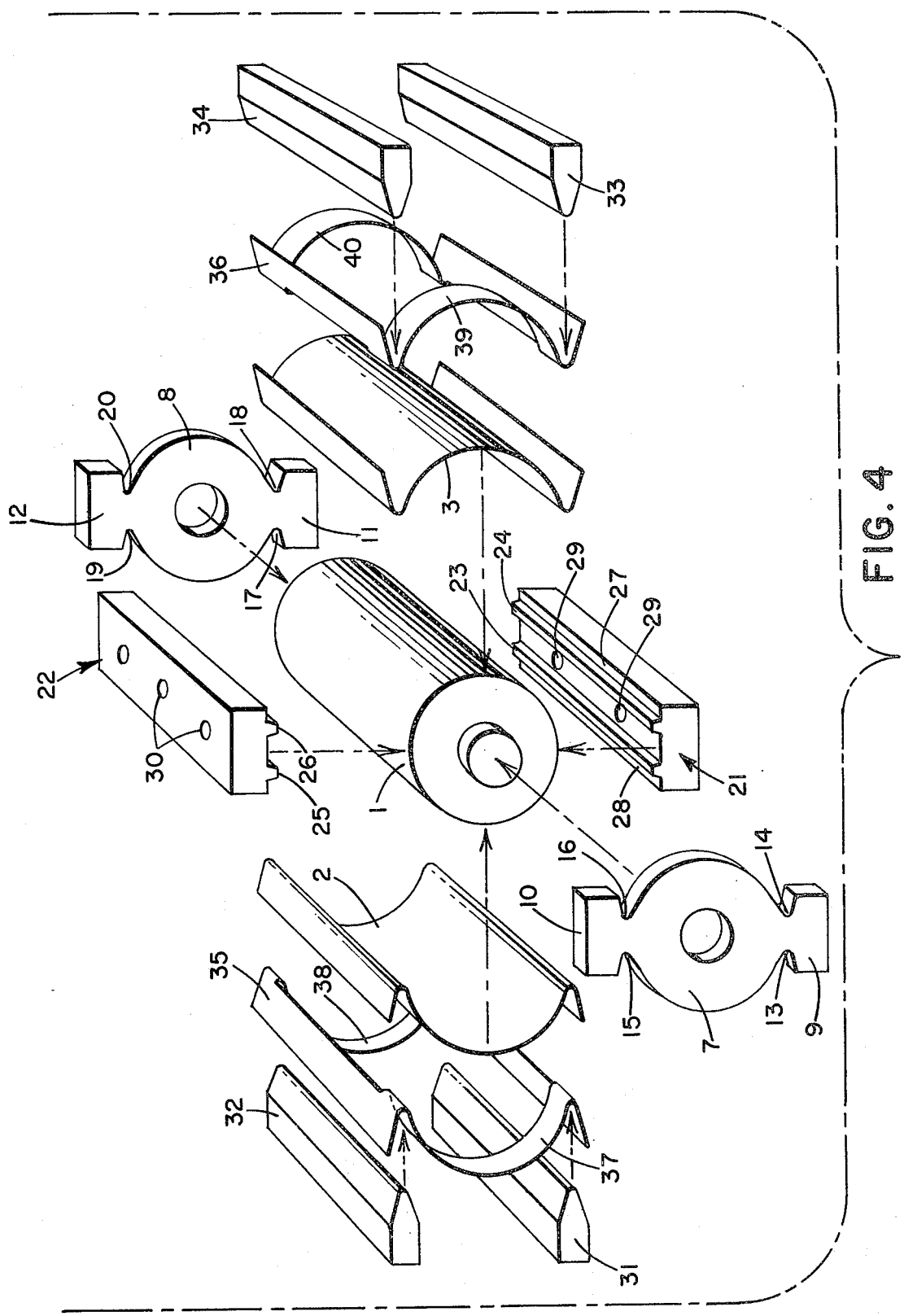
FIG. 4 is an exploded view in perspective of one embodiment of the apparatus of the invention.

FIG. 4 is an exploded view of a construction of the apparatus according to the invention. The drum 1 has two hubs or pivots, which are supported in bores of the stationary supporting members, flanges 7, 8. The flanges 7, 8 each have two projections 9, 10 and 11, 12, respectively, which, together with the central parts of the flanges, form recesses 13, 14, 15 and 16 and 17, 18, 19 and 20, respectively. Clamped between the projections of the flanges 7, 8 are two bridge pieces 21, 22, provided with longitudinal ridges 23, 24, 25 and 26. Between the longitudinal ridges and the drum surface a narrow gap is left. On the outside of the ridges are recesses; for instance 27, 28 on the bridge piece 21. The recesses on the bridge pieces 21, 22 open into the recesses in the flanges. The bridge pieces are also provided with bores such as 29, 30.

The blood oxygenator further comprises four knife-edged members 31, 32, 33 and 34. Placed between these and the membrane parts 2 and 3 are elastic sealing rings 35, 36.

When the oxygenator is being assembled, the sealing rings 35, 36 together with the membrane parts 2, 3 are mounted on the drum 1, while in a state of pre-tension. In this state they are kept by the knife-edged members 31, 32, 33 and 34 which press the sealing rings 35, 36 and the membrane parts 2, 3 into the recesses 13, 14, 15 and 16 and 17, 18, 19 and 20 of the flanges 7, 8 and in the recesses of the bridge pieces 21, 22. The tangentially running parts 37, 38 and 39, 40 of the sealing rings 35, 36, hold the membrane parts 2, 3 against the flanges 7, 8 to ensure proper sealing. This is shown in detail in FIG. 5.

The above construction is accommodated in a conventional housing to which oxygen is fed. Blood is fed to the oxygenator through blood tubes connected to the bores 30 of the bridge piece 22, which blood tubes are connected to a central blood supply conduit. Likewise, the blood is discharged from the oxygenator through blood tubes connected to a central blood discharge conduit. When the apparatus is used as an artificial lung, the central blood supply conduit is fed from a vein, whereas the central blood discharge conduit feeds the blood back to the patient.

The operation of this oxygenator corresponds to that of the construction described with reference to FIGS. 1 and 3 and 6.

Figure 5:
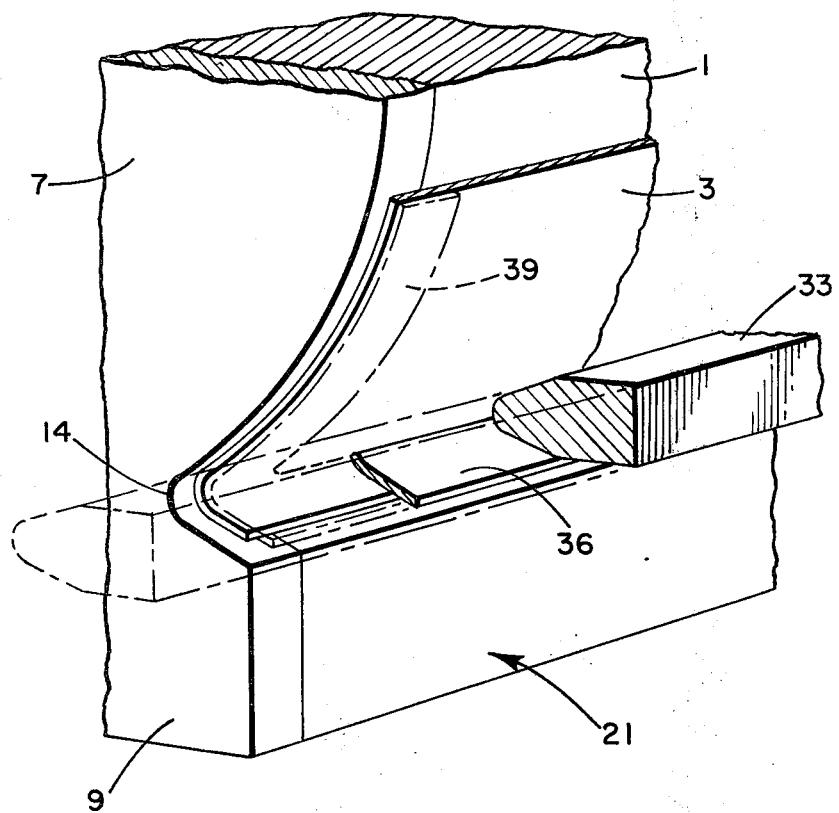
FIG. 5 is a longitudinal section of the apparatus of FIG. 4.
Figure 6:
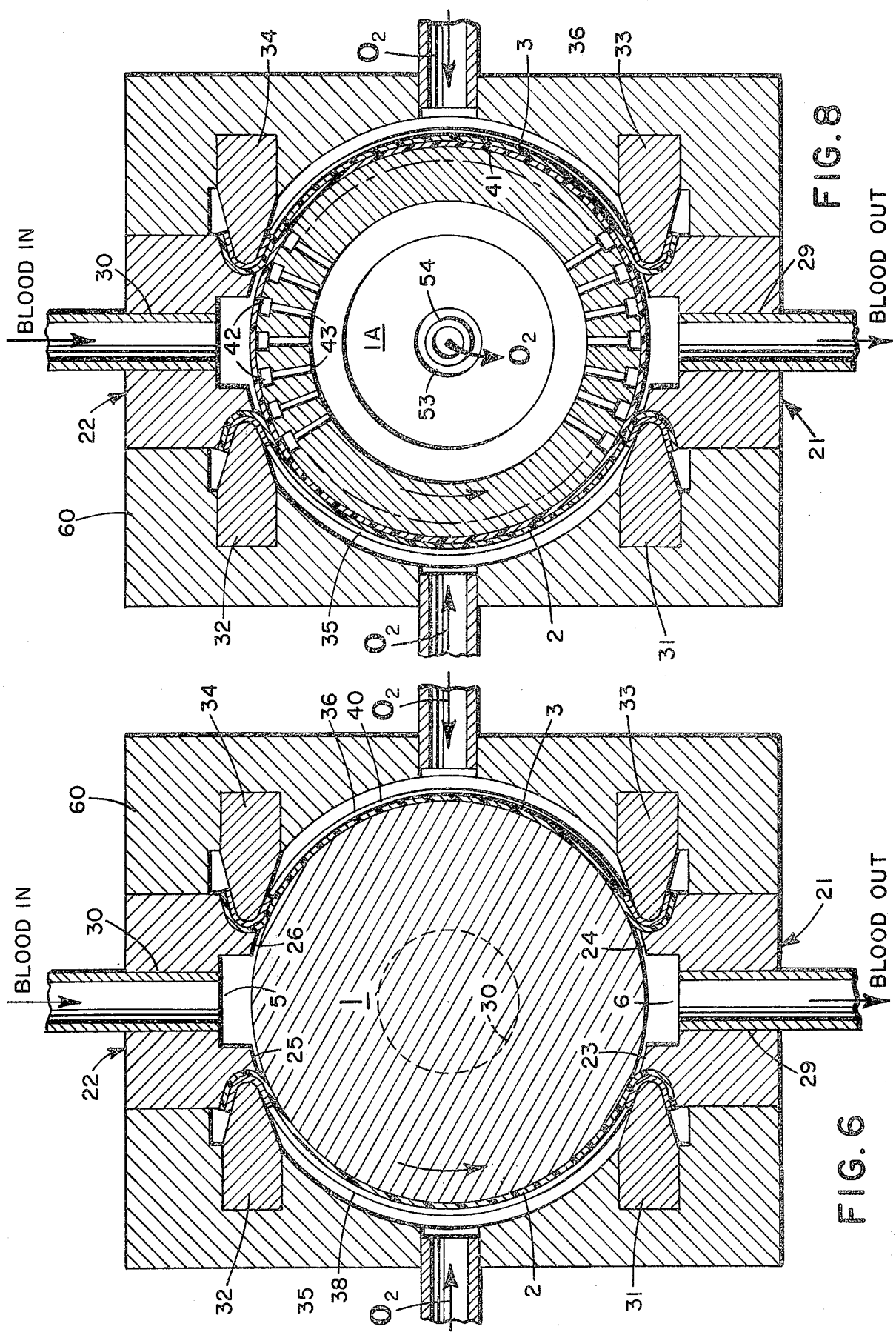
FIG. 6 is a cross-section of the embodiment illustrated in FIG 4.
Figure 7:
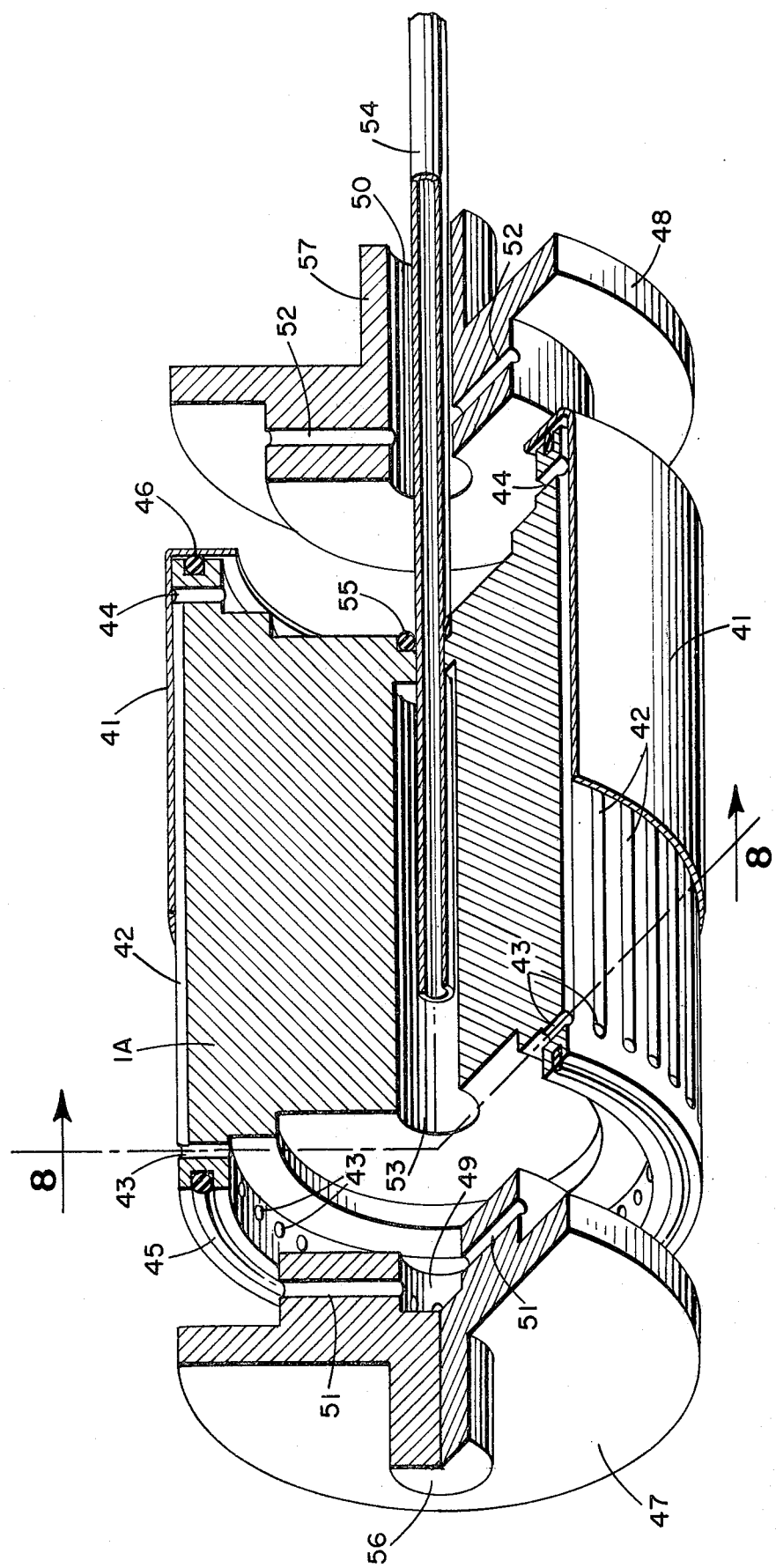
FIG. 7 is a longitudinal section of a variation of the embodiment of the apparatus illustrated in FIG. 4.

FIG. 7 shows a variation of the construction according to the FIGS. 4, 5 and 6. On the drum 1A there is placed a second, tubular membrane 41. On the circumferential surface of the drum 1A are longitudinal grooves 42 into which lead radial channels 43, 44, which are located at the ends of the drum 1A. The second membrane 41 is mounted with its ends turned over the end faces of the drum 1A. These end faces are provided with annular grooves for receiving the O rings 45, 46. Mounted on the end faces of the drum 1A are sealing disks 47, 48. They hold the ends of the membrane 41 against the end faces and thus serve to seal the space between the membrane 41 and the drum 1A. The sealing disk 47 is provided with a blind central bore 49, and the sealing disk 48 with a continuous central bore 50. The sealing disks 47, 48 are moreover provided with radial channels 51 and 52, respectively, which lead into the bores 40 and 50. The drum 1A has a central bore 53 positioned coaxial with the central bores 49, 50 in the sealing disks 47, 48.

In the bores 49, 50 and 53 is a stationary feed conduit 54 for oxygen. On the feed conduit there is placed a tightly fitting O ring 55. Retained by the sealing disk 48, it serves to seal the space between the central bore 53 and the stationary feed conduit 54. The body of revolution composed of the drum 1A and the sealing disks 47, 48 is provided with pivots 56, 57 with which it is supported in the flanges 7, 8 drawn in FIG. 4.

When the apparatus is in operation, $O_2$ flows through feed conduit 54, the bore 49 and the channels 51 in the sealing disk 47, the channels 43 and the longitudinal grooves 42 in the drum 1A to the oxygenator, and leaves it through the channels 44, the channels 52, and the bore 50 in the sealing disk 48.

In the last-mentioned construction the blood film is between two membranes, so that oxygen can be supplied from two sides. This provision leads not only to an additional increase in membrane surface area, but also to the average diffusion path being more than halved.

Further, instead of an inner roll with longitudinal grooves, a porous inner cylinder may be used. In that case the oxygen may be supplied from inside the porous cylinder.

Instead of a membrane of silicone rubber a membrane of a different material may be used. For instance, the membrane may be made of a microporous web having little elasticity. In order that in such a case again a particular gap width may automatically form between the membrane and the body of revolution, the clamping means for the membrane may be made movable in tangential direction, for instance by having them spring-mounted.

On the basis of the hydrodynamic flow principle it is possible for the artificial lung simultaneously to be used as blood pump. To this end the recirculating blood stream ($\phi_3$ in FIG. 1, 2) should be restricted by, for instance, the following provisions: using a higher pressure in the gas compartment than in the blood compartment at the outlet 6 (FIG. 1, 2); providing a mechanical constriction in the supply conduit to the recirculating flow channel, i.e. the channel in FIG. 2 formed by the right half of the annular gap 4, combined with the first provision.

Although the invention has been described in detail for the purpose of illustration, it is to be understood that such detail is solely for that purpose and that variations can be made therein by those skilled in the art without departing from the spirit and scope of the invention except as it may be limited by the claims.

We claim:

1. An apparatus for the exchange of substances between two fluids separated by a membrane, comprising a housing, a fluid-impervious member rotatably disposed coaxially in the housing with its peripheral surface in spaced relationship therewith, a membrane tautly disposed about the said member and adapted to form a first annular gap between the membrane and the rotatable member and a second annular gap between the housing and membrane in response to tangential flow of a first fluid in said first gap, inlet means for introducing the first fluid into the first gap and means spaced from the said inlet means for discharge of the first fluid from the first gap so as to cause a tangential main flow of the first fluid in the first gap, means for introducing a second fluid into the second gap, and means for removing the second fluid from said second gap.

2. The apparatus of claim 1 wherein means are provided for removing the first medium from the gap by suction.

3. The apparatus of claim 1 wherein the membrane is divided into two parts in the form of sheets and clamping means are provided for fixing the two membrane parts in position on the body of revolution.

4. The apparatus of claim 3 wherein the clamping means comprises four axially extending knife-edged members, two stationary flanges for rotatably supporting the body of revolution and two bridge pieces positioned near the circumference of the body of revolution and extending between the flanges, said flanges and bridge pieces being provided with recesses for receiving the thin sides of the knife-edged members, the axially extending sides of the membrane parts being held in said recesses by the knife-edged members.

5. The apparatus of claim 4 wherein two elastic pretensioned sealing rings which each bear against the edges of a membrane part are provided between the knife-edged members and the membrane parts, said sealing rings having tangential parts which bear against the stationary flanges.

6. The apparatus of claim 4 wherein the bridge pieces are provided with openings for the inlet and the outlet of the first medium respectively to and from the first space.

7. The apparatus of claim 1 wherein a second membrane is provided on the circumference of the body of revolution with a third space therebetween and an inlet and an outlet through which the second medium is fed into and discharged from the third space.

8. The apparatus of claim 7 wherein the third space is formed by longitudinal grooves on the circumference of the body of revolution.

9. The apparatus of claim 8 wherein the second membrane has its ends turned over the edges of the end faces, two sealing disks clamp a turned end of the membrane against an end face of the body of the revolution, one of said sealing disks having a continuous central bore and the other having a blind central bore, channels running between the bores and the circumference of the sealing disks, at the ends of said body which connect the channels in the sealing disks to longitudinal grooves in the body of revolution and with a central bore, a feed conduit for the second medium connected to the central bores of the sealing disks and of the body of revolution, one end of said conduit serving as an inlet for this medium and the other end leading into the blind central bore of the second sealing disk, a space beween the outer wall of the feed conduit and the continuous central bore of the body of revolution forming a discharge channel for the second medium.

10. The apparatus of claim 9 wherein the end faces of the body of revolution are provided with annular grooves and O-rings are provided by means of which the turned ends of the second membrane are pushed into the grooves by the sealing disks.

11. The apparatus of claim 9 wherein the body of revolution the end face opposite the first sealing disk is provided with an annular recess accommodating an O-ring which tightly fits on the feed conduit and is pushed into the annular recess by the first sealing disk.

12. An apparatus for replacing carbon dioxide in blood with oxygen, comprising a cylindrical housing, a fluid-impervious cylindrical member rotatably disposed coaxially in the housing with its peripheral surface in spaced relationship therewith, a membrane permeable to oxygen and carbon dioxide but impermeable to blood tautly disposed about the said member and adapted to form a first annular gap between the membrane and the rotatable member and a second annular gap between the housing and membrane in response to tangential flow of a fluid in said first gap, inlet means for introducing blood in the first gap and means spaced from the said inlet means for discharge of the blood from the first gap so as to cause a tangential main flow of the blood in the first gap, means for introducing oxygen into the second gap, and means for removing the oxygen from said second gap.

* * * * *